April 10, 1951 — E. A. ROCKWELL — 2,548,496
SERVOMOTOR AND VALVE DEVICE
Original Filed April 11, 1941 — 2 Sheets-Sheet 1
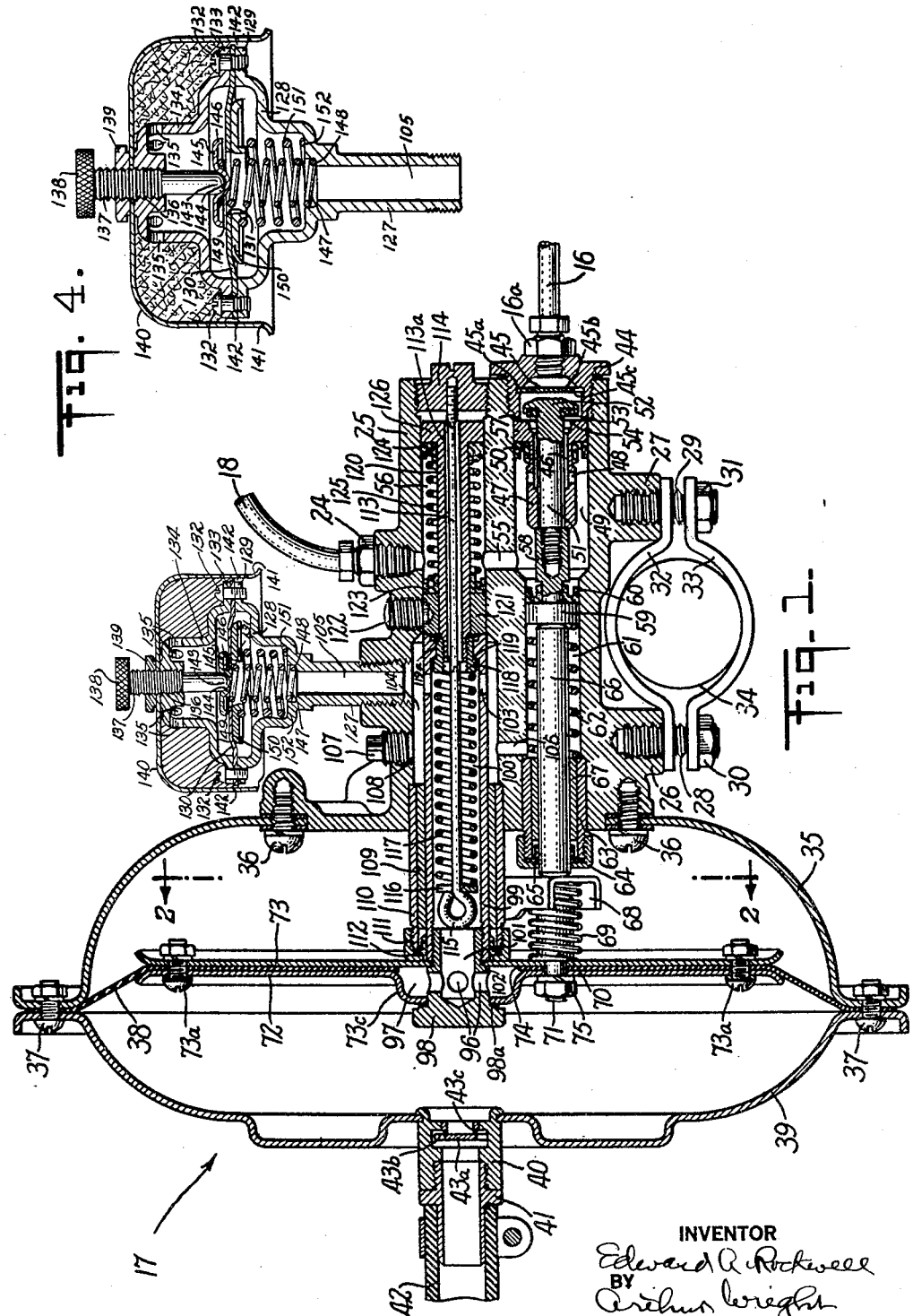

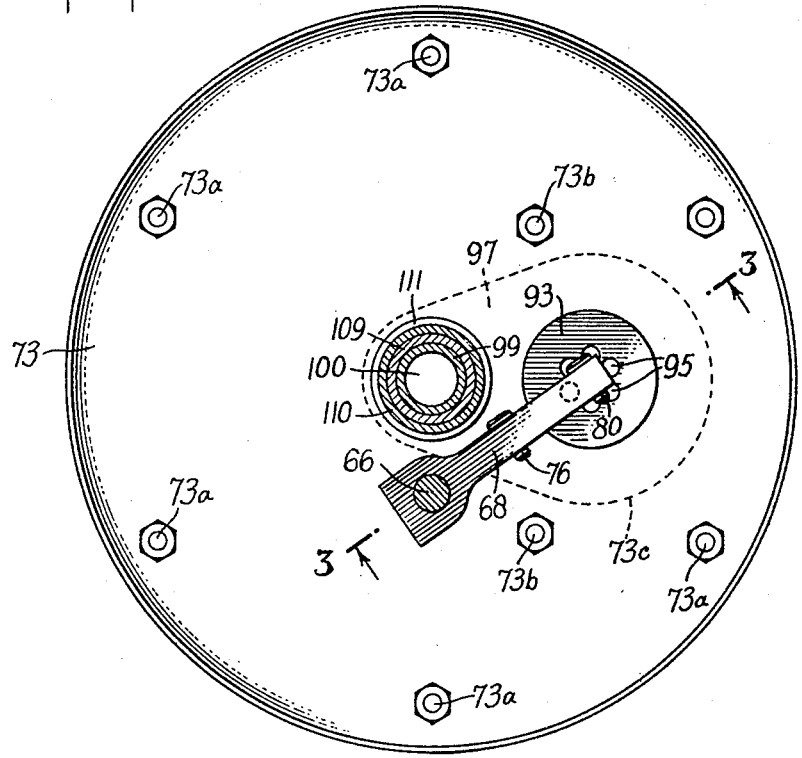
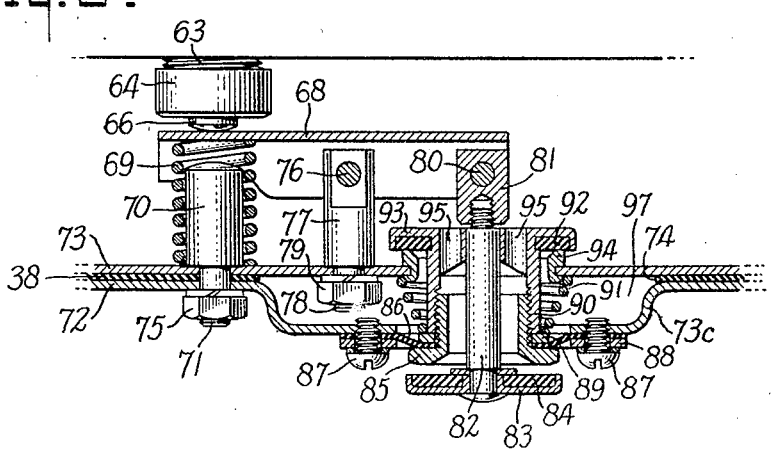

Patented Apr. 10, 1951

2,548,496

UNITED STATES PATENT OFFICE 2,548,496

SERVOMOTOR AND VALVE DEVICE

Edward A. Rockwell, Cleveland, Ohio

Application February 17, 1943, Serial No. 476,245, now Patent No. 2,388,220, dated October 30, 1945, which is a division of application Serial No. 388,003, April 11, 1941, now Patent No. 2,398,252, dated April 9, 1946. Divided and this application October 28, 1944, Serial No. 560,865

18 Claims. (Cl. 60—54.5)

My invention relates particularly to a valve apparatus designed for use with a servomotor in such a manner as to be applicable to the operation of many different types of apparatus, but which may, for example, be especially applicable to the operation of power units for controlling automobiles, airplanes, etc.

The present application is a division of my application upon Valve Apparatus, Ser. No. 476,245, filed February 17, 1943, Patent No. 2,388,220, granted October 30, 1945, which in turn is a division of my application upon Power Intensifier Valve, Ser. No. 388,003, filed April 11, 1941, Patent No. 2,398,252, granted April 9, 1946.

The object of my invention is to provide an apparatus of the above character in which the servomotor valve arrangement is provided to effectively control the inlet of differential pressures for the operation of power units of the above character. A further object in this connection, is to effectively control the application of a vacuum applied in connection therewith. Still a further object is to control the application of the same in connection with an adjustable opening or venting means. Further objects of my invention will appear from the detailed description of the same hereinafter.

While my invention is capable of embodiment in many different forms, for the purpose of illustration I have shown only one form thereof in the accompanying drawings in which—

Fig. 1 is a longitudinal section of the apparatus made in accordance with my invention;

Fig. 2 is a vertical section taken on line 2—2 of Fig. 1, showing the relative location of the valve-operating lever and diaphragm valves operated thereby;

Fig. 3 is a detailed section showing the mounting of said valve-operating lever taken on line 3—3 of Fig. 2; and Fig. 4 is a vertical section, enlarged, of the air inlet device showing the air inlet valve in its open position when taking in air.

Referring to the drawings, I have shown a flexible discharge conduit 16 which leads to a screw-threaded fitting 16a on a power unit 17, said power unit 17 having a flexible discharge pipe 18 which leads by any desired branch pipe to wheel cylinders 19 located on the four wheels of the automobile chassis (not shown) so as to operate the usual brake shoes 20 and 21 provided in connection with all of said wheels for cooperating with brake-drums (not shown) thereon. The said pipe 18 is connected by a screw-threaded fitting 24 to a plunger housing 25 of the power unit, said housing having projections 26 and 27 carrying studs 28 and 29 as well as nuts 30 and 31 to hold in place tightly clamping members 32 and 33 which are arranged to be clamped around a steering column 34 of the automobile chassis. Also secured to said plunger housing 25 there is a rear shell 35 secured in place by screws 36. The said rear shell 35, by means of screws 37, clamps in place a main diaphragm 38 against a forward shell 39 which has a screw-threaded sleeve 40 secured thereto an which communicates by a fitting 41 with a flexible pipe 42 which leads to a manifold 43 of the internal combustion engine mounted on said chassis for driving the automobile. The sleeve 40 contains a check valve 43a, for trapping and maintaining the highest available vacuum and, therefore, making it possible to utilize the highest differential pressures, provided with peripheral notches 43b and having a cylindrical valve 43c cooperating therewith. This is in order to maintain as far as possible, for the power unit, a supply of the highest differential of pressures comparable to the atmosphere by the most effective degree of vacuum available from the pipe 42.

The liquid forced manually out of the master cylinder 6 and received by the power unit 17 from the pipe 16, enters through a coupling member 44 in said plunger housing 25 into a valve chamber 45. This chamber 45 has a peripheral recess 45a into which there is sprung a liquid distributor plate 45b having near the edge thereof a marginally arranged series of notches 45c to distribute the force of the incoming liquid, thus avoiding undesirable impact on the inlet valve. The initial operation of the brakes by the manual force applied, causes the liquid to flow into a chamber 46 in a plunger 47 having ports 48 leading to a cylindrical chamber 49. The plunger 47 has a U-shaped rubber seal 50 and carries within the same a valve stem 51 having a head 52 thereon, beneath which there is a rubber gasket 53 arranged to act as a compensating inlet valve, the seat for which is a shoulder 54 on the plunger 47, so that when thus seated the hydraulic liquid, which in the initial operation of the apparatus is conveyed from the cylinder 49 by a port 55 to a pressure cylinder 56 and thence to the brakes through the pipe 18, is cut off by said valve 53, 54 so as thereafter to apply the power from the power unit. It will be noted that the valve stem 51 serves as a supporting guide for the plunger 47 which is reciprocable to some extent on said valve stem. The movement of the plunger 47 to the right, in Fig. 1, is limited by a stop 57 formed on the interior of the coupling 44 and the movement of said plunger 47 to the left of said figure is limited by a plunger sleeve 58 which is screw-threaded on the said stem 51.

The plunger sleeve 58 has thereon a plunger 59 and an annular rubber seal 60. The said plunger 59 operates in a cylindrical chamber 61 which carries a coil spring 62 normally forcing the plunger 59 to the right so as to unseat the valve 53, 54, which when open compensates the liquid on the two sides of the valve. The other end of said spring 62 rests against a sleeve 63 located tightly in the end of the chamber 61, said sleeve having a cap ring 64 and a leather gasket 65 around a rod-shaped plunger 66 carried within a bushing 67 within the sleeve 63. The said rod-like plunger 66 bears at its rear end against the plunger 59 and at its forward end bears against the end of a valve-operating lever 68, which in turn operates a spring 69 located around a guide rod 70 having a screw-threaded reduced end 71 passing through plates 72 and 73 clamped around an opening 74 on the diaphragm 38, where it is held in place by a nut 75. The plates 72 and 73 are secured together by screws 73a at the periphery thereof and screws 73b located on opposite sides of a laterally offset portion 73c of the plate 72. The said lever 68 is supported by a pivot 76, which can be placed at any desired point along said lever to obtain the desired lever ratio, on a rod 77 having a screw-threaded end 78 passing through the plate 73 to which it is tightly held by a nut 79. The other end of the lever 68 has a pivot 80, by means of which it is pivotally connected to a valve-operating sleeve 81 screw-threaded on a valve stem 82 having a vacuum or outlet valve head 83 connected thereto and which carries within the same a rubber washer 84. The said rubber washer seats upon an annular valve seat 85 which is clamped to a subsidiary diaphragm 86 supported by screws 87 and a clamping ring 88 from the plate 72. This clamping to the diaphragm 86 is accomplished by means of a clamping plate 89 held in place by a valve sleeve 90 screw-threaded to the annular valve seat 85. A coil spring 91 bears at one end against the clamping plate 89 and at the other end against the plate 73 so as to normally force the valve sleeve 90 to the left of Fig. 1 and thus seat a rubber washer 92 of an air valve or inlet valve 93 against an annular valve seat 94 carried in the plate 73. It will be noted that the valve sleeve 90 has air ports 95 leading from within the sleeve to the interior of the shell 35. The air which is admitted to the interior of the shell 35 through the valve 94 is received from openings 96 communicating with a chamber 97 between the plates 72 and 73, said opening 96 being provided in a screw-threaded plug 98, having a leather gasket 98a, passing through the plates 72 and 73. A hollow plunger 99 is screw-threaded to the plug 98 which has a central passageway 100 communicating with a longitudinal passageway 101 in the plug 98. This hollow plunger 99 clamps the plate 73 against a shoulder 102 on the said plug 98. Ports 103 in the said plunger 99 communicate with a chamber 104 in the said plunger housing 25 which has an air vent 105 leading to the outer air. The chamber 61 is also connected to said vent 105 by a passageway 106 located between the chambers 61 and 104. The said chamber 104 has a screw plug 107 which merely fills an opening 108 used for convenience in drilling the pasageway 106.

Furthermore, the said chamber 104 has a bushing 109 and outside the same a sleeve 110, which is tightly carried within the chamber 104. The end of the sleeve 110 is screw-threaded to a cap 111 which acts as a stop in the movement of the plate 73 and also serves to hold in position a leather seal 112 against the outside of the hollow plunger 99. Within the hollow plunger 99 there is a rod 113, operating in an air transfer passage 113a, the rear end of which rod is screw-threaded into a plug 114 acting as a closure for the cylindrical chamber 56. On the forward end of said rod 113 there is a head 115 holding in place a washer 116 which acts as a support for a spring 117 around the rod 113, the other end of said spring 117 being supported against a headed sleeve 118 which in turn rests against a shoulder 119 in the hollow plunger 99. The said headed sleeve 118 carries a washer 119a and, furthermore, is screw-threaded to a plunger stem 120 passing through a guiding sleeve 121 held in place in the chamber 56 by a screw 122. The said plunger 120 carries rubber seals 123 and 124 between which there is carried a coil spring 125 on the plunger stem 120, which in turn has a plunger head 126 adjacent to the rubber seal 124, which exerts a pull induced by the diaphragm 38 to place the liquid in the chamber 56 under increased pressure due to the relative sizes of the diaphragm 38 and the plunger 126.

In assembling the power unit it will be understood that the diaphragm 38, plates 72 and 73 and the valve elements together with the operating lever 68 mounted thereon, can be made into one assembly and the plunger mechanism made into another assembly and that these two assemblies can then be assembled together while at the same time securing the shells 35 and 39 thereto.

In Fig. 4 I have shown an air inlet device in which there is provided means for adjusting the amount of air admitted at different altitudes, having correspondingly different barometric pressures, at which the automobile is operated and so as to control the outlet pressure of the apparatus. In this figure I have shown connected to the air vent port 105 a screw-threaded tube 127 having a flared portion 128 provided with a flange 129 against which there is clamped a rubber diaphragm 130, having a central aperture 131, by means of screws 132 passing through the diaphragm into said flange 129 and passing through a flange 133 on an air valve housing 134 provided with air ports 135. The upper portion of the housing 134 has a screw-threaded opening 136 through which there is arranged to pass an adjusting screw 137 provided with knurled head 138. On the screw 137 there is a lock-nut 139 so as to hold in place above the housing 134, an air filter shell 140 filled with horse hair and which has a depending rim 141 so arranged as to leave an annular air inlet 142 between the same and the flanges 129 and 133. The adjusting screw 137 has a rounded lower end 143 which is received in a recess 144 in an air valve plate 145 having a downwardly directed rim 146, the air valve plate 145 being pressed upwardly into a stationary position unaffected by the air and vacuum by a compressed spring 147 which is supported at its lower end on a shoulder 148 within the tube 127. The rim 146 is arranged to be adjusted into or out of contact with the diaphragm 130 so as to provide an air passageway 149 between the valve plate 145 and said diaphragm 130. The diaphragm 130 is supported in its uppermost position by a supporting ring 150 which is dished upwardly so as to receive a coil spring 151 seated at its lower end on a shoulder 152 in the inside of the flared portion 128 of the tube 127. When operating the automobile at high altitudes the spring 151 will be in its position of full extension with the plate 145 adjusted out of contact with the diaphragm 130, whereas at lower altitudes or where the output pressure applied to the brakes is to be lessened, the plate 145 will be adjusted into contact with the diaphragm 130 so as to compress the spring 151 more or less, as desired, according to the position of the screw 137. However, whether or not such control is initially present, the operation of the power unit will open the passageway 149 more or less according to the suction applied from the pipe 127.

In the operation of the apparatus, when it is desired to apply the brakes some of the liquid from a master cylinder (not shown) passes from the pipe 16 through the valve chamber 45, ports 48, port 55, chamber 56 and pipe 18 to the wheel brake cylinders 19 so as to move the brake shoes 20 and 21 up into position, for applying the main braking effect. A further increase of this manual pressure from the pipe 16 will cause the piston 59 to move forwardly in the chamber 61, thus closing the valve 53, 54 and simultaneously operating the lever 68 so as to move the valve 83 into closed position while moving forwardly, slightly, the plates 72 and 73 as well as the diaphragm 38 through the intermediary of the spring 69. Further increase of the manual pressure, resulting in further movement of the plunger rod 66 in this direction, results in opening the air inlet valve 93 due to the further movement of the lever 68 and the yielding of the diaphragm 86. The opening of the valve 93 admits the air to the desired extent from the vent 105, ports 103, chamber 100, passageway 101, ports 96 and thence to within the rear diaphragm shell 35 on the right of the diaphragm 38. This exerts a hydraulic pressure in the chamber 56 which, by its reaction, has a tendency to move the diaphragm 38 in the opposite direction to its direction of movement by the manual force applied. The effect of this incoming air from the valve 93 is balanced between said valve 93 and the diaphragm 96 so as to prevent the valve 93 from being suddenly opened by said incoming air. It will be noted, furthermore, that the air may be admitted, in this way, to the chamber within the shell 35 in any desired increments and that between the accession of such increments to the right of the diaphragm 38 the two valves 83 and 93 will be in lapped or closed position due to the pneumatic pressure, above referred to, tending to move the diaphragm 86 downwardly in Fig. 3 in any one position of power application in which the pedal 1 is held. In other words, as the diaphragm 58 moves to the left, in Fig. 1, the pivot 76 is carried thereby, and upon cessation of movement of the pedal 1, while the valve 93 is still open, the diaphragm 38 will still continue to move to the left slightly as the left hand end of the plunger 106 is then a stationary pivot. At this time, also, a slight movement of the lever 68 affects the valves 83 and 93, to move them into lapped position. Consequently, the said valves can apply a modulated degree of pressure to the right side of the diaphragm 38, as desired. Similarly, the air may be withdrawn by increments in the same manner from the right of the diaphragm 38 through the opening of the valve 83 to the desired extent for this purpose, by lessening the pressure exerted manually. When the atmospheric air pressure has been admitted to the desired extent to the right of the diaphragm 38, this action will be accompanied by the movement of the hollow plunger 99 to the left in Fig. 1 against the compression of the spring 117 so that the plunger head 126 will move to the left in said figure, thereby placing the liquid which is in the chambers 56 and 49 under a pressure to the extent desired and as determined by the manual pressure, thus applying the power pressure through the pipe 18 to the brakes and exerting the reaction from the chambers 56 and 49. This pressure exerted on the brakes may be of any desired maximum but may, for example, be about 1500 lbs. per square inch, whereas the manual pressure applied from the master cylinder may, for example, be from 0 to 600 lbs. per square inch, or any other ratio of these or other pressures can be obtained, as desired. In view of the fact that liquid from the master cylinder is directly connected to and takes part in the movement of the brake shoes 20 and 21, the said diaphragm produces the desired power pressure on the brakes with a very short path of travel of the manual means and which obviously is a shorter path of travel than would be the case if the brake shoes 20 and 21 were moved only by the air pressure acting on the diaphragm 38. Because of this arrangement, in which the foot always performs a part of the work by supplying a part of the liquid used in applying the brakes, even when the power is being applied about 40% of the liquid in applying the brakes is provided by the foot pressure. This is owing to the fact that the volume received in the right hand end of the bore in which the plunger 47 slides is smaller than the volume delivered by the pipe 18, thus providing for a small pedal travel. In fact, at times the foot pressure applied to the brakes can be increased without substantially moving the foot forwardly. Thus, an effective modulation of the pressures applied to the brakes is obtained at all times, by the manual pressure or the manual pressure and the power pressure proportionally thereto. However, in this power unit, whatever force is supplied manually is entirely offset by an equal and opposite force from the power piston 120 so that, consequently, all the brake-applying force for operating the brakes, when the power is on, is derived entirely from the power plunger 120. This apparatus is thus a full power unit. For these reasons, also, the brake is practically as effective, irrespective of considerable variations in the vacuum from the manifold, due to the direct connection just referred to and the large size of the diaphragm 38. Also, the diaphragm 130 acts as a check valve in such a manner that when the maximum power pressure in the pipe 18 has been applied by the operation of the diaphragm 38, added pressure can be applied by increasing the manually applied pressure in the pipe 18 without substantially moving the piston 126 to the right in Fig. 5, inasmuch as the diaphragm 130 will seat upwardly on the valve seat 149, thus trapping and slightly increasing the air pressure in the pipe 105. It will be noted accordingly that, after the vacuum valve 83 is closed and the air valve 93 is opened it still is possible to have independent movement for further intensifying the pressures, while avoiding retraction of the diaphragm 38. Furthermore, it will be noted that at all times a reaction passes from the liquid applied in the operation of the brakes back to the foot, through the pipe 16, either from the liquid in the chamber 49 through the valve 53, 54 when this valve is open, or from the chamber 49 on the plunger 47 when said valve is closed, thereby making the degree of application of the brakes readily ascertainable without the pedal being moved towards its off position. Also, the actuation of the brakes is made more effective by reason of the coordination of the travel of the manual means to the movement of the brakes, as it will be evident that the movement of the brake liquid is coordinated to the travel of the liquid supplied from the master cylinder. In order to throw the brakes out of operation, the manual pressure is fully released, whereupon the spring 69 opens the valve 83 and allows the valve 93 to close the springs 117 and 125 withdraw the diaphragm 38 to the right, thus admitting vacuum thence through the ports 95 to the right of the diaphragm 38. This action is accompanied by the unseating of the valve 53, 54, thus restoring the parts again to their original positions and compensating for any possible loss of liquid in the power unit, ready for the application of the brakes as desired.

In the form of air inlet apparatus as shown in Fig. 4, the adjusting screw 137 is arranged to adjust the air inlet plate 145 to any desired position according to the altitude at which the automobile is operating or the barometric pressure and according to the amount of the maximum output pressure desired to be applied to the brakes. In other words, when the automobile is operating at a high altitude, with consequent lessened atmospheric pressure, the plate 145 will be adjusted upwardly to a position away from contact with the diaphragm 130, so as to compensate for the entry of air at the lessened barometric pressures, in order to more nearly approximate uniformity in the air supply or to increase the maximum brake pressure. Under these circumstances, therefore, the length of the spring 51 is such as to leave the diaphragm 130 out of contact with the plate 145. When, however, the automobile is operating at a lower altitude, or when it is desired to decrease the maximum available pressure output supplied to the brakes, the plate 145 will be adjusted downwardly by the screw 137 until it contacts with the diaphragm 130 or until, by further adjustment, it compresses the spring 151 to the point desired. Of course, when the apparatus is being operated to apply pressure to the brakes, the incoming air will in any case move the diaphragm 130 downwardly so as to pass through the air inlet 142, ports 135, passage 149 and thence into the tube 127, thus applying to the diaphragm 130 the desired degree of the vacuum exerted at the right of the diaphragm 38, Fig. 1. When the valve plate 145 has been adjusted into contact with the diaphragm 130, the incoming air pressure will, of course, move the diaphragm 130 downwardly by compressing the spring 151. Of course there will be some difference in the downward movement of the diaphragm 130 according to the degree of vacuum on the diaphragm 38 in Fig. 1. The compressed spring 47 merely presses the air valve plate 145 upwardly against the adjusting screw 137.

It will be understood that instead of supplying a vacuum to the fitting 41 this may be a vent and that instead of the port 105 being a vent this may be connected to a source of superatmospheric air pressure.

While I have described my invention above in detail I wish it to be understood that many changes may be made therein without departing from the spirit of the same.

I claim:

1. A power mechanism, comprising an inlet in the power mechanism adapted to be connected to a source of pressure differing from the atmospheric pressure, a chamber, a conduit connecting said source to the chamber, a check valve in said conduit adapted to admit and maintain substantially the highest difference from atmospheric pressures supplied from said source to the chamber, a movable wall in said chamber adapted to be moved, for the performance of work, by said pressure differing from the atmosphere, manually controlled valve means for controlling the application of said pressure to the movable wall, a normally closed vent, a passageway connecting the vent to said chamber, and an adjustable pressure-responsive device connected to the vent passageway and constructed to be responsive to changes in pressure in said passageway tending to open said vent upon decrease of the pressure differing from the atmosphere and movably operable independently of said manually controlled means to adjust by pre-selection the amount of air admitted and the consequent effectiveness of the said pressure in moving said wall.

2. A power mechanism, comprising an inlet in the power mechanism adapted to be connected to a source of pressure differing from the atmospheric pressure in the form of a vacuum, a chamber, a conduit connecting said source to the chamber, a check valve in said conduit adapted to admit and maintain substantially the highest difference from atmospheric pressures supplied from said source to the chamber, a movable wall in said chamber adapted to be moved, for the performance of work, by said pressure differing from the atmosphere, manually controlled valve means for controlling the application of said pressure to the movable wall, a normally closed vent, a passageway connecting the vent to said chamber, and an adjustable pressure-responsive device connected to the vent passageway and constructed to be responsive in changes in pressure in said passageway tending to open said vent upon decrease of the pressure differing from the atmosphere arranged in the form of a diaphragm venting valve responsive to inlet and outlet pressure differences in said passageway to adjust the amount of air admitted and the consequent effectiveness of the said pressure in moving said wall.

3. A power mechanism, comprising an inlet in the power mechanism adapted to be connected to a source of pressure differing from the atmospheric pressure in the form of a vacuum, a chamber, a conduit connecting said source to the chamber, a check valve located at said chamber adapted to admit and maintain substantially the highest difference from atmospheric pressures supplied from said source to the chamber, a movable wall in said chamber adapted to be moved, for the performance of work, by said pressure differing from the atmosphere, manually controlled valve means for controlling the application of said pressure to the movable wall, a normally closed vent, a passageway connecting the vent to said chamber, and an adjustable pressure-responsive device connected to the vent passageway and constructed to be responsive to changes in pressure in said passageway tending to open said vent upon decrease of the pressure differing from the atmosphere arranged in the form of a venting valve comprising a diaphragm and a stationary valve seat, responsive to inlet and outlet pressure differences in said passageway and retractible according to the air pressure applied thereto by said passageway, to adjust the amount of air admitted and the consequent effectiveness of the said pressure in moving said wall.

4. A power mechanism, comprising an inlet in the power mechanism adapted to be connected to a source of pressure differing from the atmospheric pressure in the form of a vacuum, a chamber, a conduit connecting said source to the chamber, a check valve located at said chamber adapted to admit and maintain substantially the highest difference from atmospheric pressures supplied from said source to the chamber, a movable wall in said chamber adapted to be moved, for the performance of work, by said pressure differing from the atmosphere, manually controlled valve means for controlling the application of said pressure to the movable wall, a normally closed vent, a passageway connecting the vent to said chamber on the other side of the movable wall from said conduit, and a valve in said passageway connected to the vent passageway and constructed to be responsive to pressure differences in said passageway due to said vacuum tending to open said vent upon decrease of the pressure differing from the atmosphere and movably operable independently of said manually controlled valve means.

5. A power mechanism, comprising an inlet in the power mechanism adapted to be connected to a source of pressure differing from the atmospheric pressure in the form of a vacuum, a chamber, a conduit connecting said source to the chamber, a check valve located at said chamber adapted to admit and maintain substantially initially the highest difference from atmospheric pressures supplied from said source to the chamber and thereafter remain seated to trap and maintain substantially the highest admitted pressures, a movable wall in said chamber adapted to be moved, for the performance of work, by said pressure differing from the atmosphere, manually controlled valve means for controlling the application of said pressure to the movable wall, a normally closed vent, a passageway connecting the vent to said chamber on the other side of the movable wall from said conduit, and a valve in said passageway connected to the vent passageway and constructed to be responsive to pressure differences in said passageway due to said vacuum tending to open said vent upon decrease of the pressure differing from the atmosphere and movably operable independently of said manually controlled valve means.

6. A power mechanism, comprising an inlet in the power mechanism adapted to be connected to a source of pressure differing from the atmospheric pressure, a chamber, a conduit connecting said source to the chamber, a check valve located at said chamber adapted to admit and maintain substantially the highest difference from atmospheric pressures supplied from said source to the chamber, a movable means in said chamber adapted to be moved, for the performance of work, by said pressure differing from the atmosphere, manually controlled valve means for controlling the application of said pressure to the movable means, a normally closed vent, a passageway connecting the vent to said chamber on the other side of the movable means from said conduit, a valve in said passageway connected to the vent passageway and constructed to be responsive to atmospheric pressures tending to open said vent upon decrease of the pressure differing from the atmosphere and to pressure differences in said passageway, and means to adjust by preselection manually the effectiveness of the said pressure in moving said means.

7. A power mechanism, comprising an inlet in the power mechanism adapted to be connected to a source of pressure differing from the atmospheric pressure in the form of a vacuum, a chamber, a conduit connecting said source to the chamber, a check valve located at said chamber adapted to admit and maintain substantially the highest difference from atmospheric pressures supplied from said source to the chamber, a movable means in said chamber adapted to be moved, for the performance of work, by said pressure differing from the atmosphere, a manually controlled valve means for controlling the application of said pressure to the movable means, a normally closed vent, a passageway connecting the vent to said chamber on the other side of the movable means from said conduit, and a valve in said passageway responsive to said vacuum, in the form of a diaphragm venting valve connected to the vent passageway constructed to be responsive to inlet and outlet pressure differences in said passageway to adjust the amount of air admitted and the consequent effectiveness of the said pressure in moving said means tending to open said vent upon decrease of the pressure differing from the atmosphere and movably operable independently of said manually controlled valve means.

8. A power mechanism, comprising an inlet in the power mechanism adapted to be connected to a source of pressure differing from the atmospheric pressure in the form of a vacuum, a chamber, a conduit connecting said source to the chamber, a check valve located at said chamber adapted to admit and maintain substantially the highest difference from atmospheric pressures supplied from said source to the chamber, a movable means in said chamber adapted to be moved, for the performance of work, by said pressure differing from the atmosphere, manually controlled valve means for controlling the application of said pressure to the movable means, a normally closed vent, a passageway connecting the vent to said chamber on the other side of the movable means from said conduit, and a valve in said passageway responsive to said vacuum, in the form of a diaphragm venting valve connected to the vent passageway and constructed to be responsive to inlet and outlet pressure differences in said passageway, tending to open said vent upon decrease of the pressure differing from the atmosphere, said diaphragm being retractible according to the air pressure applied thereto, to adjust the amount of air admitted and the consequent effectiveness of the said pressure in moving said means.

9. A power mechanism, comprising an inlet in the power mechanism adapted to be connected to a source of pressure differing from the atmospheric pressure in the form of a vacuum, a chamber, a conduit connecting said source to the chamber, a check valve located at said chamber adapted to admit and maintain substantially the highest difference from atmospheric pressures supplied from said source to the chamber, a movable means in said chamber adapted to be moved, for the performance of work, by said pressure differing from the atmosphere, manually controlled valve means for controlling the application of said pressure to the movable means, a normally closed vent, a passageway connecting the vent to said chamber on the other side of the movable means from said conduit, and a valve in said passageway responsive to differences in said vacuum, in the form of a spring-supported diaphragm venting valve connected to the vent passageway and constructed to be responsive to inlet and outlet pressure differences in said passageway tending to open said vent upon decrease of the pressure differing from the atmosphere, to manually adjust the amount of air admitted and the consequent effectiveness of the said pressure in moving said means.

10. A power mechanism, comprising an inlet in the power mechanism adapted to be connected to a source of pressure differing from the atmospheric pressure in the form of a vacuum, a chamber, a conduit connecting said source to the chamber, a check valve located at said chamber adapted to admit and maintain substantially the highest difference from atmospheric pressures supplied from said source to the chamber, a movable means in said chamber adapted to be moved, for the performance of work, by said pressure differing from the atmosphere, manually controlled valve means for controlling the application of said pressure to the movable means, a normally closed vent, a passageway connecting the vent to said chamber on the other side of the movable means from said conduit, and a manually adjustable valve in said passageway responsive to said vacuum, in the form of a spring-supported diaphragm venting valve connected to the vent passageway and constructed to be responsive to inlet and outlet pressure differences in said passageway, tending to open said vent upon decrease of the pressure differing from the atmosphere, said diaphragm being retractible according to the air pressure applied thereto by said passageway, to manually adjust the amount of air admitted and the consequent effectiveness of the said pressure in moving said means.

11. A power mechanism, comprising an inlet in the power mechanism adapted to be connected to a source of pressure differing from the atmospheric pressure, a chamber, a conduit connecting said source to the chamber, a check valve located at said chamber adapted to admit and maintain substantially the highest difference from atmospheric pressure supplied from said source to the chamber, a movable means in said chamber adapted to be moved, for the performance of work, by said pressure differing from the atmosphere, manually controlled valve means for controlling the application of said pressure to the movable means, a vent, a passageway connecting the vent to said chamber on the other side of the movable means from said conduit, and a valve in said passageway constructed to be responsive to atmospheric pressures and to pressure differences in said passageway, said valve having a stationary spring-supported valve member and an adjusting screw for said member.

12. A power mechanism, comprising an inlet in the power mechanism adapted to be connected to a source of pressure differing from the atmospheric pressure in the form of a vacuum, a chamber, a conduit connecting said source to the chamber, a check valve located at said chamber adapted to admit and maintain substantially the highest pressures supplied from said source to the chamber, a movable means in said chamber adapted to be moved, for the performance of work, by said pressure differing from the atmosphere, manually controlled valve means for controlling the application of said pressure to the movable means, a vent, a passageway connecting the vent to said chamber on the other side of the movable wall from said conduit, and a valve in said passageway constructed to be responsive to pressure differences in said passageway due to said vacuum, said valve comprising a diaphragm having an annulus supporting the same, a stationary valve seat cooperating with said diaphragm and concentric coil springs supporting said annulus and seat respectively.

13. A power mechanism, comprising an inlet in the power mechanism adapted to be connected to a source of pressure differing from the atmospheric pressure, a chamber, a conduit connecting said source to the chamber, a check valve located at said chamber adapted to admit and maintain substantially initially the highest difference from atmospheric pressures supplied from said source to the chamber and thereafter remain seated to trap and maintain substantially the highest admitted pressures, a movable means in said chamber adapted to be moved, for the performance of work, by said pressure differing from the atmosphere, manually controlled valve means for controlling the application of said pressure to the movable means, a vent, a passageway connecting the vent to said chamber on the other side of the movable means from said conduit, and a valve in said passageway constructed to be responsive to atmospheric pressures and to pressure differences in said passageway, said valve comprising a stationary spring-supported valve member and an adjusting screw for said member.

14. A power mechanism, comprising an inlet in the power mechanism adapted to be connected to a source of pressure differing from the atmospheric pressure in the form of a vacuum, a chamber, a conduit connecting said source to the chamber, a check valve located at said chamber adapted to admit and maintain substantially initially the highest difference from atmospheric pressures supplied from said source to the chamber and thereafter remain seated to trap and maintain substantially the highest admitted pressures, a movable means in said chamber adapted to be moved, for the performance of work, by said pressure differing from the atmosphere, manually controlled valve means for controlling the application of said pressure to the movable means, a vent, a passageway connecting the vent to said chamber on the other side of the movable wall from said conduit, and a valve in said passageway constructed to be responsive to pressure differences in said passageway due to said vacuum, said valve comprising a diaphragm having an annulus supporting the same, as well as a stationary valve seat cooperating with said diaphragm and concentric coil springs supporting said annulus and seat respectively.

15. A power mechanism, comprising an inlet in the power mechanism adapted to be connected to a source of a relatively lower pressure, a chamber, a movable wall in said chamber, adapted to be moved, for the performance of work, by said pressure, a hydraulic intensifier piston connected to the movable wall, a manually movable means movable against the force exerted by the movable wall, a hydraulically controlled valve means movable by said manual means for controlling the application of said pressure to the movable wall to operate the intensifier piston, an opening leading to a relatively higher pressure, a passageway connecting the opening to said chamber, and a check valve associated with the movable wall and the intensifier piston and arranged to seat in order to prevent the intensifier piston from being moved when further manual pressure is applied by the manual means after said first mentioned pressure has been applied to the movable wall.

16. A power mechanism comprising an inlet in the power mechanism adapted to be connected to a source of pressure differing from the atmospheric pressure, a chamber, a conduit connecting said source to the chamber, a check valve in said conduit, a movable wall in said chamber, adapted to be moved, for the performance of work, by said pressure differing from the atmospheric pressure, a hydraulic intensifier piston connected to the movable wall, a manually movable means movable against the force exerted by the movable wall, a hydraulically controlled valve means movable by said manual means for controlling the application of said pressure to the movable wall to operate the intensifier piston, a vent, a vent passageway connecting the vent to said chamber and a check valve in said vent passageway arranged to be seated to trap the air on the higher pressure side of the movable wall so as to retain the air in the vent passageway and thereby prevent the intensifier piston from being moved when further manual pressure is applied by the manual means after said pressure, differing from the atmospheric pressure, has been applied to the movable wall.

17. A power mechanism comprising, means for applying power including a power motor, a piston connected for operation by the motor and a piston cylinder for producing a hydraulic pressure, an outlet connection from said means for the performance of work, an inlet connection for applying a range of manual pressure to said means capable of exceeding the pressure produced by the power means, and means including a fluid valve associated with said piston, arranged and constructed to prevent the retraction of the power actuated piston when the manual pressure exceeds the power applying pressures, said manually applied pressure and power applied pressures being hydraulically connected together.

18. A power mechanism comprising, means for applying power including a power motor, a piston connected for operation by the motor and a piston cylinder for producing a hydraulic pressure, an outlet connection from said means for the performance of work, an inlet connection for receiving a range of manual pressure to said means capable of exceeding the pressure produced by the power means, means for applying to said inlet connection a manual pressure exceeding a power applying pressure, and means including a fluid valve associated with said piston, arranged and constructed to prevent the retraction of the power actuated piston when the manual pressure exceeds the power applying pressures, said manually applied pressure and power applied pressures being hydraulically connected together.

EDWARD A. ROCKWELL.

REFERENCES CITED

The following references are of record in the file of this patent:

UNITED STATES PATENTS

| Number | Name | Date |
| --- | --- | --- |
| 102,300 | Morton | Apr. 26, 1870 |
| 1,403,290 | Catching | Jan. 10, 1922 |
| 1,653,985 | Campbell | Dec. 27, 1927 |
| 1,770,194 | Bragg | July 8, 1930 |
| 1,809,014 | Bragg | June 9, 1931 |
| 1,826,417 | Bragg | Oct. 6, 1931 |
| 1,887,750 | Bragg | Nov. 15, 1932 |
| 2,252,482 | Gates | Aug. 12, 1941 |
| 2,260,490 | Stelzer | Oct. 28, 1941 |